United States Patent
Siegrist

[19]

[11] Patent Number: 5,873,435
[45] Date of Patent: Feb. 23, 1999

[54] VEHICLE BRAKE

[76] Inventor: Eric Siegrist, R.R. #2, Wiarton, Ontario, Canada, N0H 2T0

[21] Appl. No.: 802,413

[22] Filed: Feb. 18, 1997

[30]     Foreign Application Priority Data

Feb. 26, 1996 [CA] Canada .................................. 2,170302

[51] Int. Cl.$^6$ ..................................................... F16D 51/00
[52] U.S. Cl. ........................................... 188/76; 188/18 R
[58] Field of Search .................................. 188/76, 218 R,
188/218 A, 18 R, 264 AA; 192/73, 113.2,
113.21, 113.23; 301/6.3, 6.6, 6.7

[56]             References Cited

U.S. PATENT DOCUMENTS

| 3,744,594 | 7/1973  | Cashion  | 188/76   |
| 4,129,201 | 12/1978 | Tamura   | 188/76   |
| 4,222,466 | 9/1980  | Brimaud  | 188/76   |
| 4,477,120 | 10/1984 | Jamon    | 188/76 X |
| 5,293,967 | 3/1994  | Siegrist | 188/76 X |
| 5,474,160 | 12/1995 | Siegrist | 188/76 X |

FOREIGN PATENT DOCUMENTS

| 145009  | 12/1964 | Germany .        |
| 1137062 | 1/1965  | United Kingdom . |
| 9501519 | 6/1994  | WIPO .           |
| 9512765 | 11/1994 | WIPO .           |

Primary Examiner—Lee W. Young

[57]             ABSTRACT

The brake system employs a ring braking member and a suspended brake caliper having a responsive linkage correcting the caliper and a knuckle support arrangement. The ring braking member is preferably die cast as a single component with a control hub and is of a lightweight, high temperature aluminum composite material. The brake system is designed to have a relatively thick ring brake member of this lightweight material to provide sufficient capacity to absorb the heat of braking and transfer of this heat to the surrounding air prior to the ring brake reaching a temperature where damage is likely to occur. The normal operating temperature is well below the theoretical maximum temperature or rated temperature of the composite material.

18 Claims, 5 Drawing Sheets

VEHICLE BRAKE

FIELD OF THE INVENTION

The present invention relates to vehicle brakes and, in particular, relates to vehicle brakes having a ring braking member.

BACKGROUND OF THE INVENTION

Over the last number of years of disc brakes have proven very popular for cars and in most cases are provided as standard equipment on at least the front wheels. These brakes often include an anti-lock braking feature to provide maximum braking effect without lock up. This typically increases the heat required to be dissipated by the system.

The auto industry has also almost completely shifted to front wheel drive cars and the space available at the front wheels has been reduced and, in many cases, the size of the brake components has been reduced.

Many car braking systems, during even normal use of the car, will cause the disc rotors to become very hot leaving them vulnerable to brake fade and also vulnerable to damage from high temperature warping or high temperature stress. Anti-lock braking systems also contribute to the problem, in that, the brakes do not lock and, therefore, the brakes continue to absorb a large amount of heat during heavy braking.

Another factor to consider in vehicle brakes is the weight of the rotating braking member as this can appreciably effect the gas mileage of the vehicle. It is desirable to provide a brake system which is relatively light weight. Unfortunately, this normally affects the ability of the brake system to absorb heat energy without subjecting the braking system to temperatures where failure or damage to the braking system are likely to occur. With braking systems, the energy required to brake the vehicle is essentially transferred into heat absorbed by the braking system and eventually transferred to the surrounding air. There are a number of braking systems which are ventilated to improve the amount of heat which is transferred to the surrounding air.

In recent years, there have been a number of high temperature, lightweight, aluminum composite materials and there have been a number of attempts to design a braking system which has the rotating braking member, for example the disc, made of this high temperature composite material. Unfortunately, these prior disc systems do not have sufficient ability to absorb the heat produced during the braking and effectively distribute this heat to the surrounding air to maintain a satisfactory operating temperature of the braking system. These high temperature aluminum composite materials, to date, have not worked satisfactory in a braking system involving disc brakes.

Ring brakes as opposed to a disc brake have a ring braking member where the actual braking member is at a fixed radial distance from the axis of rotation. The ring braking member has opposed inner and outer braking surfaces and a caliper arrangement is used to apply force to these braking surfaces. By applying force to both braking surfaces, the problems associated with the high strength and high weight of a drum-type braking arrangement is avoided.

SUMMARY OF THE INVENTION

A vehicle brake according to the present invention comprises a cylindrical-like ring braking member having opposed braking surfaces located either side of the cylindrical-like braking member. A knuckle arrangement supports the ring braking member and accommodates rotation of the ring braking member about a longitudinal axis of the cylindrical-like braking member. The vehicle brake includes a brake caliper mounted to the knuckle arrangement by means of a pivoted link mechanism. The brake caliper includes an outer brake pad fixed to the caliper and an inner brake pad moveable by an actuator towards the outer brake pad with the ring braking member located therebetween. The pivoted link mechanism allows the caliper to float such that movement of the inner brake pad towards the outer brake pad brings the brake pads into contact with the ring braking member for braking thereof.

According to an aspect of the invention, the ring braking member is a single casting of a lightweight, high temperature aluminum composite material.

According to a further aspect of the invention, the vehicle brake has the ring braking member integral with a hub and the hub receives a bearing structure rotatably supporting the ring braking member from the knuckle arrangement.

According to yet a further aspect of the invention, the hub has a host of ports therethrough, generally located intermediate a center axis of the hub and the ring braking member which ports promote the transfer of the heat from the hub to the surrounding air when the ring braking member is rotating.

In the preferred embodiment, the hub is integral with the ring braking member and heat is quickly dissipated throughout the aluminum composite material. In this way, heat is drawn away from the ring braking member to the hub and transferred to the surrounding air. The aluminum composite material has a high specific heat and is able to absorb a lot of energy while maintaining the temperature of the ring braking member within its operating range. This ability to absorb the energy in combination with the ability to dump the energy to the surrounding air assists in maintaining a low operating temperature of the brake for normal use.

According to a further aspect of the invention, the knuckle arrangement and the caliper are cast of an aluminum alloy material, preferably a 356 aluminum alloy material, rendering the structure relatively lightweight. The high temperature aluminum composite material is preferably limited to the ring braking member as the costs for this composite material is several times higher than the aluminum used for the knuckle arrangement.

According to a further aspect of the invention, the caliper is positioned such that the brake pads are generally orientated in a vertical-type manner to hang either side of the ring braking member. In this way, gravity is not directly acting on the brake pads to cause them to come into contact with the ring braking member. The brake pads are brought into contact with the ring braking member by an actuator which forces the inner brake pad into contact with the ring braking member and draws the outer brake pad into engagement therewith. When the actuating force is removed, the brake pads will back off the ring braking member and essentially the ring braking member can cause the brake pads to move to a clearer position. It is possible to have a retracting mechanism for pulling the brake pads away from the ring braking member, however, this has not been necessary for some applications.

According to a further aspect of the invention, the inner brake pad has, associated therewith, a pin member which provides a structural component allowing the inner brake pad to move in a radial direction during actuation of the inner brake pad while providing the necessary opposing force to retain the brake pad in the caliper as the brake pad is applied to the braking member which is moving there past.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
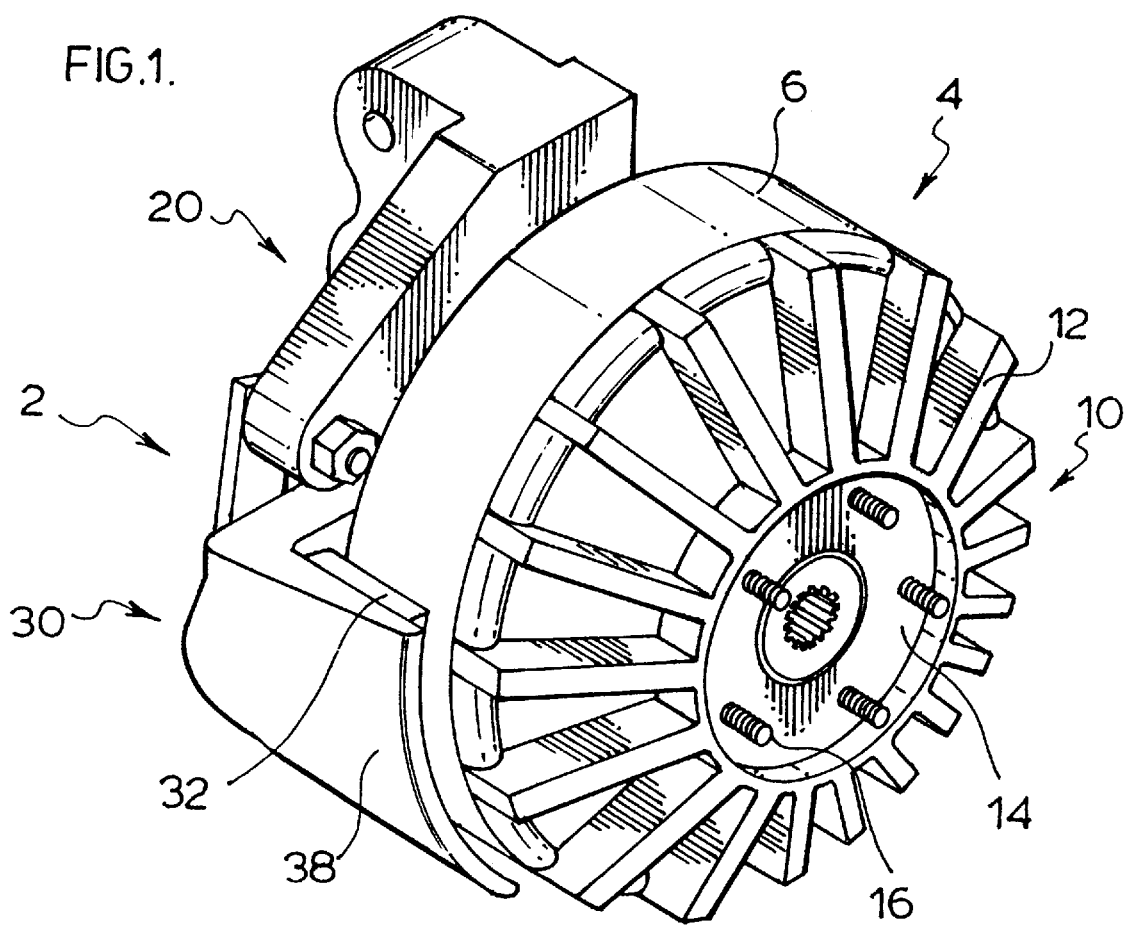
FIG. 1 is a perspective view of the vehicle brake arrangement.

The vehicle brake arrangement 2 is shown in a form particularly suitable for the front wheel of a front wheel drive car. The brake arrangement includes a ring braking member 4 having an outer braking pad 6 and an inner braking pad 8 shown in FIG. 3. The ring braking member 4 includes a hub 10 formed of a center plate 14 and a number of struts 12. The struts serve to connect the center plate 14 to the ring braking member with a number of ports provided between adjacent struts 12. Bolts 16 allow a wheel hub to be attached to the vehicle brake arrangement. The struts interact with the ambient air and allow transfer of heat energy to the air. It is preferred that the ring braking member 4, the hub 10, struts 12 and center plate 14 are of a single casting. The preferred material is a high temperature aluminum composite material. At present, there is a high temperature aluminum alloy material offered by Alcan under the trade-mark DURACAN. There have been a number of studies where a disc brake has the actual disc made of this material, however, the system did not work entirely satisfactorily due to the high temperature build-up and the exposure of the disc member to temperatures causing failure thereof. At high temperatures, excessive wear can also occur.

One preferred material for the ring braking member, the hub, the struts and the center plate is offered by Inco and is a high temperature aluminum product having therein approximately 10% silicon carbide and 5% nickel-coated graphite. The material is referred to under the trade-mark GRA-NI. Details of this material are disclosed in European Published Application No. 567 284 and/or Canadian Published Application No. 2,094,369 (Rohatgi et al) as well as methods for casting or forming.

Figure 4:
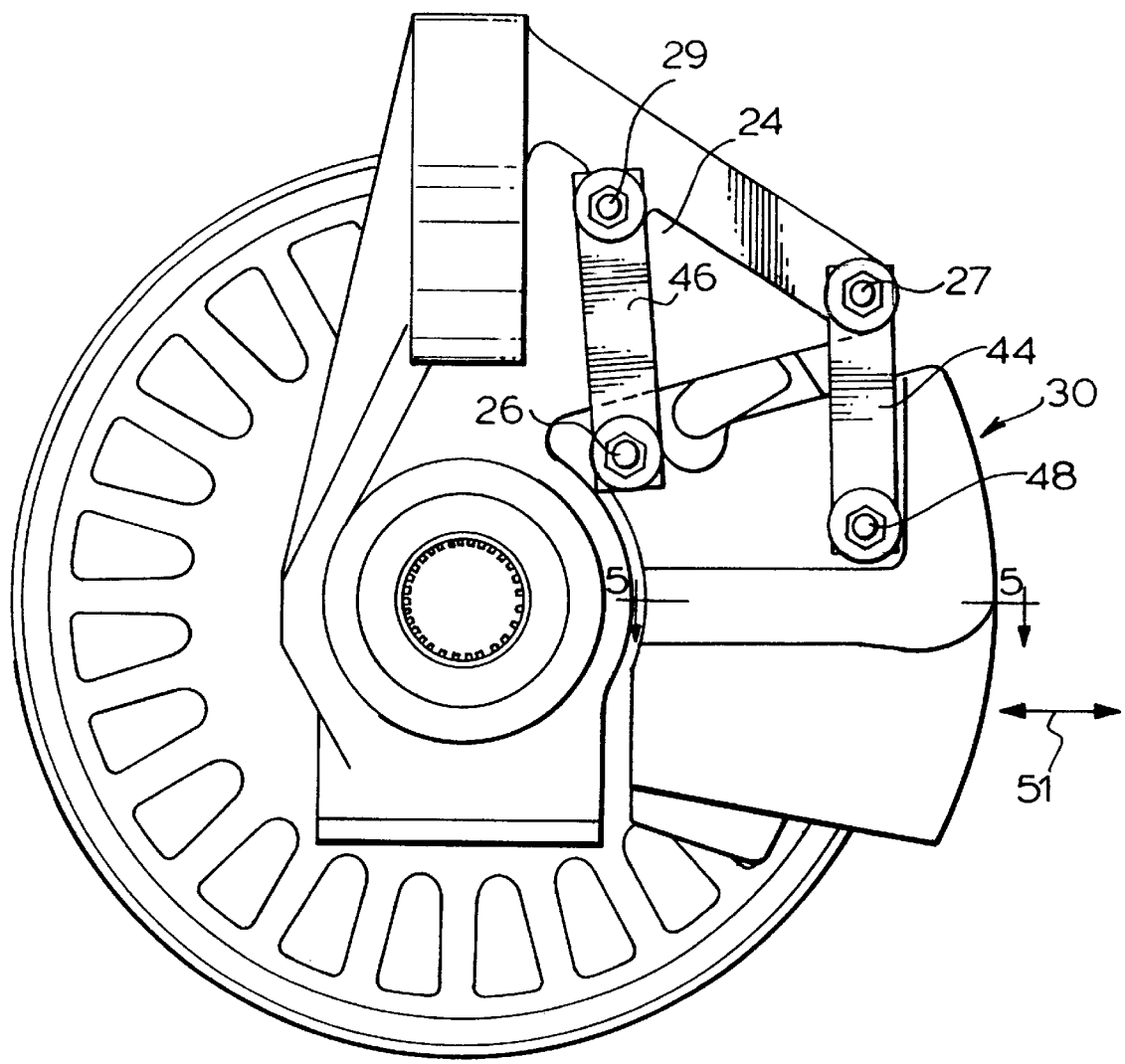
FIG. 4 is a side view of the vehicle brake arrangement showing the caliper.
Figure 5:
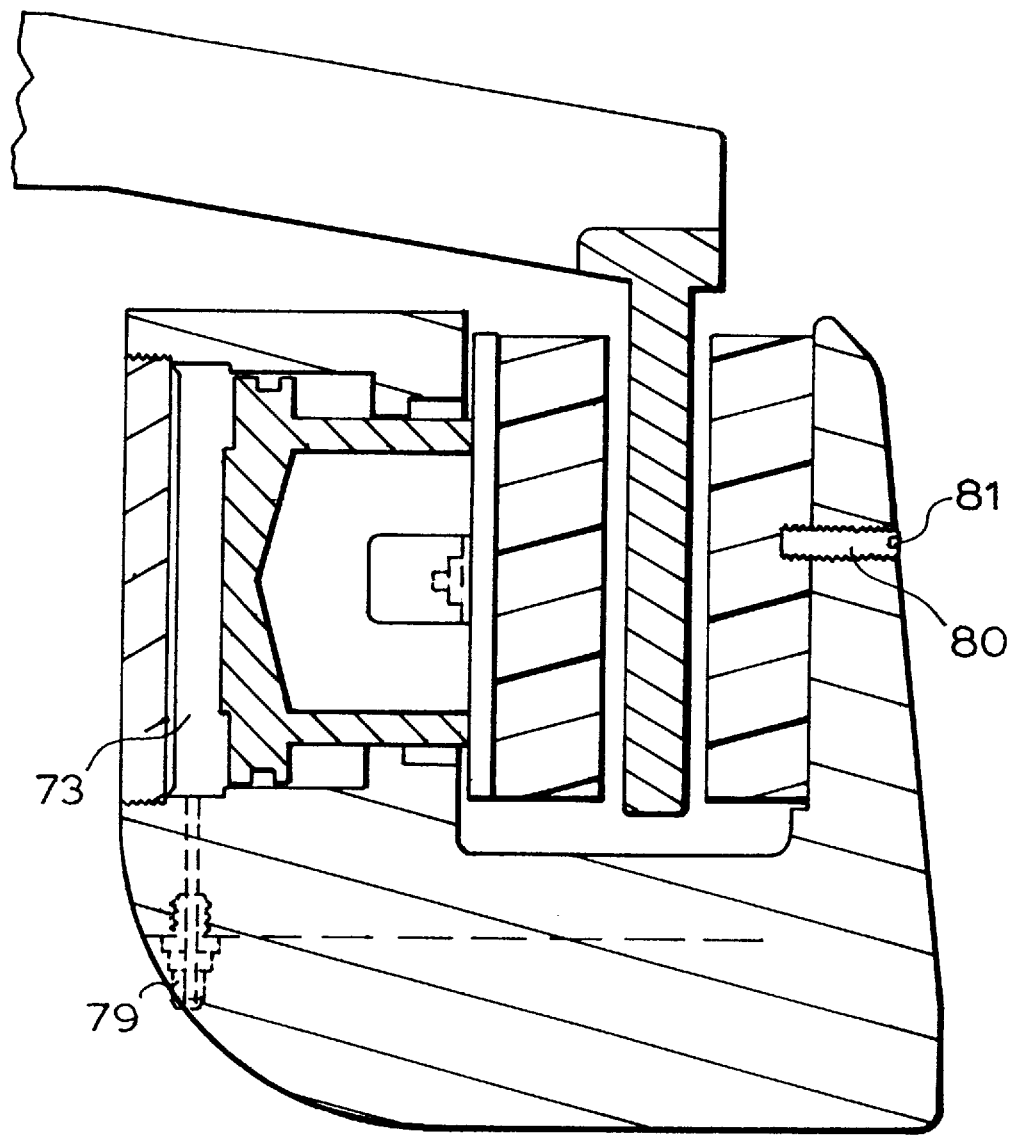
FIG. 5 is a partial sectional view along lines 5—5 of FIG. 4.

The knuckle 20 is used to secure the vehicle brake arrangement 2 to the vehicle and has the suspension lug 22 with ports 23 for effecting securement to the vehicle. The knuckle 20 also includes a support lug 24 from which the caliper 30 is suspended. The suspension of the caliper is generally shown in FIG. 4. The caliper receives and maintains the outer brake pad 32, which has an arced inner surface corresponding to the cylinder braking member, and an inner brake pad 34. The outer brake pad is fixed to the outer flange 38 of the caliper (see FIGS. 5 and 6) and brought into engagement with the ring braking member when the inner brake pad is actuated by driving radially outwardly. This causes the caliper to change its position of suspension below the supporting lug 24 such that the brake pads can grip the ring braking member.

In FIG. 1, the outer brake pad 32 is shown attached to the outer flange 38, however, it is preferred that the brake pad 32 be slidably received within a slide recess open at the interior of the outer flange 38 to simplify securement of the outer pad within the flange 38 during initial assembly or during replacement of the pads, as may be necessary.

Securement of the outer brake pad is accomplished by inserting end 83 into the slide of outer flange 38. End 83 of the pad is loosely received initially in the slide as the pad tapers outwardly towards end 85. Line 87 shows where end 85 would be if no taper was provided. The slide within the outer flange 38 is similarly tapered, but does preferably define an interference fit. Approximately the last ¼ inch required to fully insert the pad can be done by force (i.e. by hammering the pad into the flange). It is also possible to heat the flange to expand the slide to thereby accommodate the pad fully in the slide. Use of the brake tends to improve retention of the pad in the slide. If desired, other arrangements for retention are possible.

Figure 2:
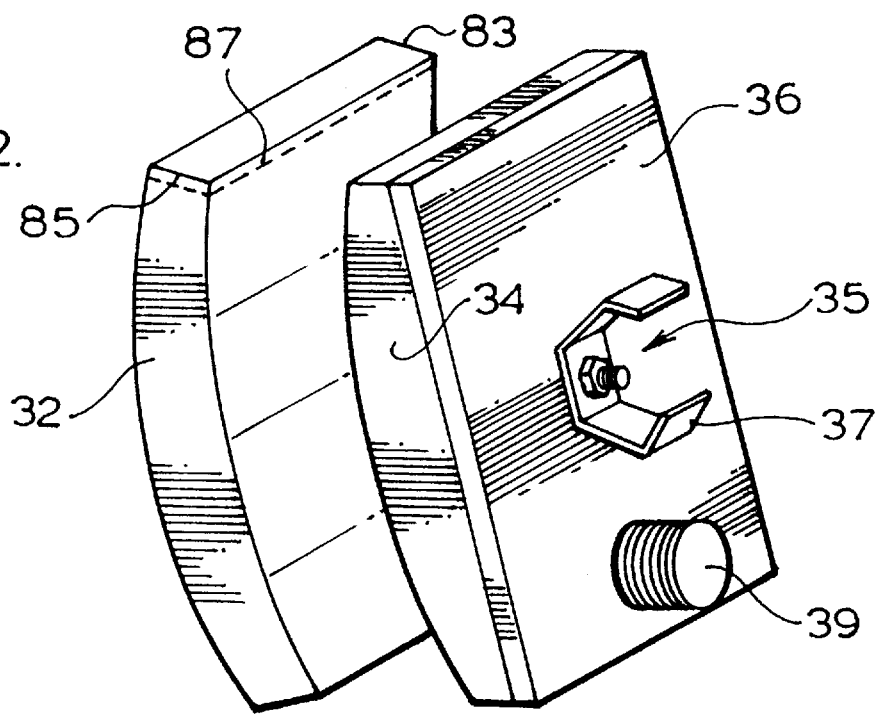
FIG. 2 is a perspective view showing the inner and outer brake pads of the braking arrangement.

In FIG. 2, several aspects of the invention are shown. It can be seen that the outer pad 32 is preferably of increasing thickness towards a midpoint of the pad in the direction of rotation of the ring braking member and this serves to bind the pad within the outer flange 38 during braking. The inner brake pad 34 has a backing plate 36 to which the brake pad is attached. In the example shown, the bolt and nut arrangement 35 engages the back of the backing plate 36 and a head is recessed in the brake pad 34. This arrangement also secures the spring clamp 37. The spring clamp 37 is received in the piston actuator and maintains the location of the inner brake pad in the caliper, as will be more fully described in FIG. 6.

Figure 3:
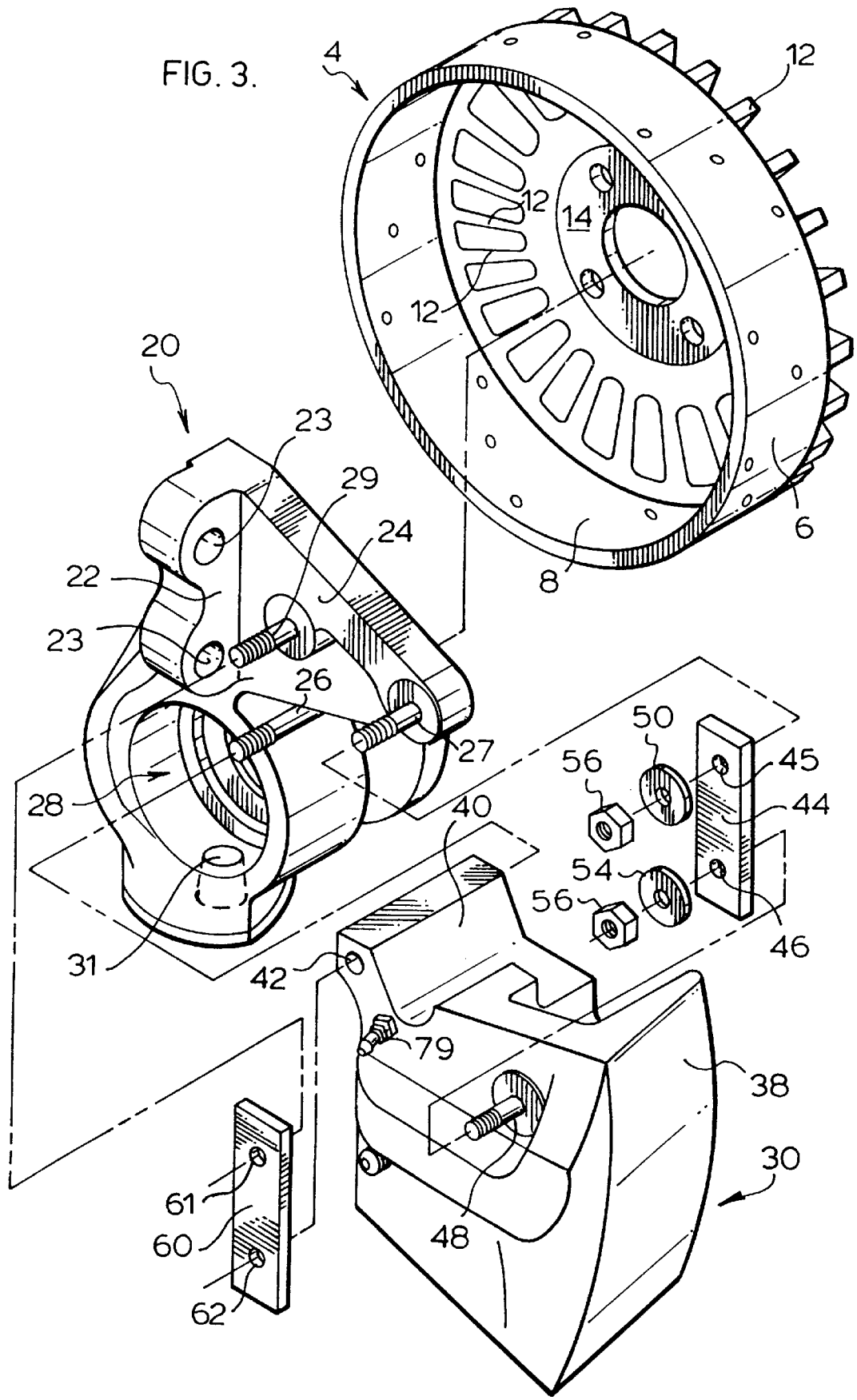
FIG. 3 is an exploded perspective view of the vehicle brake arrangement.

The knuckle 20, as shown in FIG. 3, has bolts 27 and 29 for effecting suspension of the caliper 30 from the knuckle arrangement. The caliper 30 includes a caliper connection lug 40 having a port 42 which receives the bolt 26 which serves to secure the caliper connection lug 40 to the port 62 of the link plate 60. The upper end of the link plate 60 has a port 61 which is inserted on the bolt 29 secured to the support lug 24 on the knuckle 20. A second link plate 44 has the port 46 attached to the bolt 48 on the caliper with a further port 45 in the link plate sleeved on the bolt 27 fixed on the support lug 24 of the knuckle arrangement.

Figure 6:
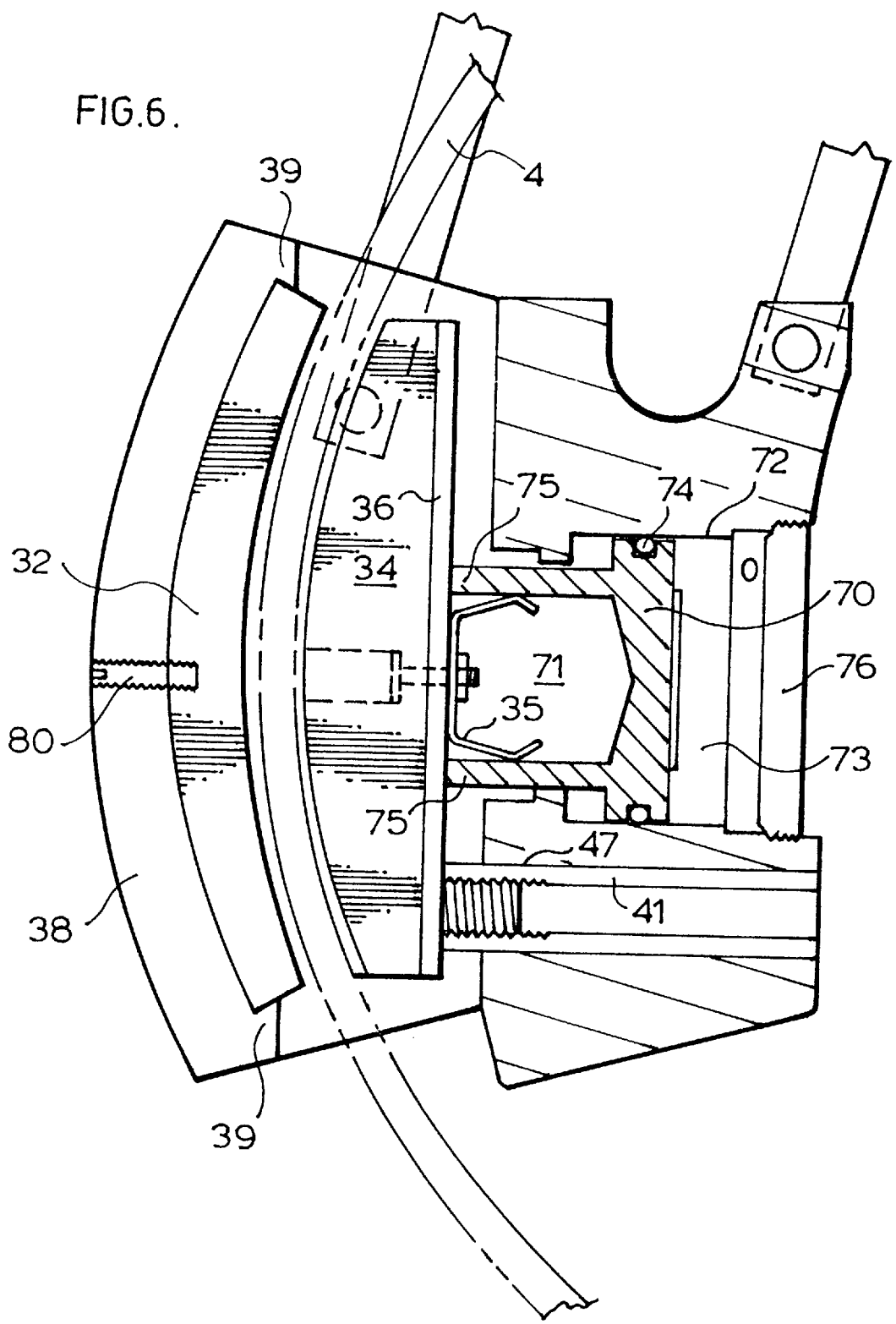
FIG. 6 is a sectional view of part of the caliper and the ring braking member.

In this way, as shown in FIG. 6, the caliper 30 is suspended below the support lug 24 by means of the link plates 44 and 46, which essentially form a four bar linkage. The caliper is hung by the link members and can move in and out in the direction of arrow 51. This will occur during actuation of the inner brake pad, which essentially draws the caliper in towards the knuckle 20 and release of the brake pads will allow the caliper to essentially self-position in a clear position, allowing the ring brake to pass essentially unobstructed between the brake pads.

As shown in FIG. 3, the knuckle 20 includes a large port, generally shown as 28, to support the bearings as well as to accommodate the drive spindle for the front wheels. Washers 50 and 54 are provided on the outside of the link plate 44, and nuts 56 engage the respective bolts. A similar mechanical fastening is provided for the link plate 60, although it is not specifically shown. The knuckle 20 also includes a small port 31 which can be used for securing of the ball joint in the knuckle.

The link plates are separated from the caliper and the knuckle by low friction washers whereby the links are generally free to move. It is also possible to dampen movement of the caliper, if necessary. In this case, different rubber washers can be used in combination with the low friction washers. The rubber washers tend to remember an initial position and provide snap-back to a clear position.

FIG. 6 shows details of the actuating piston 70 moving within the cylinder 72 of the caliper. The piston 70 includes an O-ring seal 74 between the piston and the cylinder 72. The bottom of the cylinder 72 is closed by plug 76. Removal of the plug 76 allows the piston to be removed. The piston 70 adjacent the inner brake pad includes a center cavity 71 into which the spring bracket 35 of the inner brake pad 34 is located. The thread connector 39 of the brake pad threadably receives the cylinder 41 and this slides within the guideway 47. It allows the pad to move in and out, but provides the necessary resistance to oppose stripping of the inner brake pad from the caliper. This allows piston 70 to provide the force for moving the brake pad radially towards the outer brake pad and the piston has very little side load. This simplifies sealing of the piston. Hydraulic fluid is introduced into the chamber 73 for driving of the piston 70 through inlet 79. The piston includes shoulders 75 engaging the back of the back plate 36 and applying a force to the brake pad to move it in the desired direction. The inner brake pad comes in contact with the ring braking member 4 and continued movement of the inner brake pad towards the outer brake pad draws the outer brake pad into engagement with the ring braking member 4 as the caliper swings inwardly towards the knuckle 20. Thus, the caliper essentially floats the inner and outer brake pads either side of the ring braking member 4.

When the brake is released, the fluid within the chamber 73 is free to leave the chamber, and thus, the inner brake pad 34 can apply pressure against the piston 70 causing it to back off. There can also be some recovery of the O-ring 74 to pull the piston back to a retract type position. In any event, either the piston 70 is positively drawn back or is urged back by the ring braking member to a generally clear position. Similarly the outer brake pad will assume a clear position. The suspension of the caliper from the support lug 24 assists in allowing the caliper to assume a generally clear position.

It can also be seen in FIG. 6 that the outer flange 38 includes shoulders 39 either end thereof which positively retain the outer brake pad 32. If desired, a mechanical fastener can threadably engage outer flange 38 and be received in a blind hole of the brake pad to positively retain the outer brake pad within the flange 38. Such a fastener is shown as 80 in FIG. 6. In many cases, this may not be necessary and the interference sliding in and out capability of the outer pad into the slide of flange 38 will be sufficient and simplify service. Basically, the wheel can be pulled from the vehicle and this outer pad can then be removed from the flange 38 without disassembling the caliper. The inner brake pad can also be removed and replaced by merely pulling the piston to a fully retracted position and then separating the inner brake pad by maintaining the position of the piston and pushing the inner brake pad towards the outer brake pad. This will allow the spring clip to clear the piston and the backing plate to rotate out of the caliper at which time the pad can be removed and replaced. In this way, the brake pads can easily be inspected and replaced as required without extensive expertise and cost. With the mechanical fastener for holding the outer brake pad, it can be seen in FIG. 5, that it can be disengaged from the outside of the flange by merely rotating it using the slot 81. Fluid is introduced into the hydraulic chamber 73 through the hydraulic connector 79.

A vehicle brake of the design generally shown in the Figures has been used on a GM Cavalier vehicle to replace the disc brakes provided thereon. It has been found that the brake provides much more efficient braking and under a standard test for brake fade, which involves a series of brake actuations, the brake assembly worked more than satisfactorily in contrast to the factory installed disc brakes where serious problems occurred. The ring brake member was generally the diameter of the outer disc and was accommodated within the space provided at the wheel. The actual corner (i.e. the knuckle, the ring brake and caliper) of the present invention, made of the materials generally referred to in the application, weighed approximately 24 pounds whereas the standard equipment of the vehicle, which involves a disc brake with an iron type rotor, had a weight of approximately 30 pounds. Therefore, there was a substantial savings in weight while providing superior braking. It was also found that the ring brake did not approach the upper temperature limit of the material and in normal operation is several hundred degrees below this point. At these lower temperature levels, better wear characteristics occur. If one was to design this ring brake knuckle arrangement to provide the same braking force as existing standard disc brakes, a significant further weight improvement could be realized, i.e. the system would be substantially lighter than the standard equipment. This is very important with respect to gas mileage while providing the same degree of performance. In actual practice, applicant believes that many brake systems are not satisfactory and it would be more desirable to provide improved braking while still providing some weight benefits. There is a trade-off between the designed braking effect and weight.

The caliper mount and the knuckle 20 uses a parallel link arrangement or shackle arrangement having pivot points which can easily be protected to avoid excessive wear. The arrangement allows the brake pads to be easily installed within the system and also allow convenient service of the brake pads.

It has been found that organic brake pads are preferred. A totally organic brake pad has relatively poor conductivity, and thus, maintains heat within the pad as opposed to efficient transfer of the heat to the caliper. Thus, the caliper is relatively cool. It has been found that the ring braking member can cool the pads as it continues to sweep by the pads, even though the brake is not actuated. The brake pads can be designed for the particular high temperature material of ring braking member, however, in general, brake pads which did include some metals, such as iron or copper, caused problems and have not been helpful. The preferred brake pads were provided by Abex and were totally organic, containing fiberglass, carbon particles, binders and other organic ingredients.

The ring braking member 4, when made of the high temperature aluminum composite material, is relatively thick, in the order of 0.350 inch, to protect the ring braking member from excessive temperatures. Even though the aluminum is a good thermal conductor, the additional thickness is desirable to allow time for transfer to the hub and to the surrounding air. The ring braking member 4 is preferably die cast, which allows the product of the casting to be near net shape and greatly simplifies the manufacture of the product. These materials can be difficult to machine and the less machining, the better.

It is also desirable to provide a shield (not shown) for protecting the inner braking surface from water and dirt. The ring braking member can also include a series of holes to allow any dirt on the inner braking surface to pass outwardly and out of the system. These holes can also provide a pumping of air through the ring braking member to further improve heat transfer. These holes can be simply machined afterwards, in that they are mere holes through the surface or can be part of the actual die casting. The pumping of air improves heat dissipation, but care must be exercised to keep dirt and water out of the pumped air to avoid possible wear problems.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A vehicle brake comprising a ring braking member having opposed braking surfaces located either side of said ring braking member, a knuckle arrangement supporting said ring braking member and accommodating rotation said ring braking member about a longitudinal axis of said ring braking member; said vehicle brake further including a brake caliper mounted to said knuckle arrangement by means of a pivoted link mechanism, said brake caliper including an outer brake pad fixed to said caliper and an inner brake pad movable by an actuator towards said outer brake pad with said ring braking member therebetween, said pivoted link mechanism accommodating movement of said caliper relative to said ring braking member powered by said actuator during movement of said inner brake pad towards said outer brake pad to bring said brake pads into contact with said ring braking member for braking thereof; and wherein said actuator is part of and moves with said caliper.

2. A vehicle brake as claimed in claim 1 wherein said ring braking member is a single casting of a lightweight, high temperature aluminum composite material.

3. A vehicle brake as claimed in claim 2 wherein said ring braking member is integral with a hub, said hub receiving a bearing structure rotatably supporting said ring braking member from said knuckle arrangement.

4. A vehicle brake as claimed in claim 3 wherein said hub has a host of ports therethrough to promote transfer of heat from said hub to surrounding air when said ring braking member is rotating.

5. A vehicle brake as claimed in claim 2 wherein said knuckle arrangement and said caliper are of 356 Aluminum material.

6. A vehicle brake as claimed in claim 5 wherein said brake is of a total weight of less than 24 pounds.

7. A vehicle brake as claimed in claim 1 wherein said caliper positions said brake pads at a side of said ring braking member approximately 90° from a top surface of said ring braking member.

8. A vehicle brake as claimed in claim 1 wherein said caliper is positioned on said ring braking member such that said brake pads are not urged by gravity into contact with said ring braking member.

9. A vehicle brake as claimed in claim 8 wherein said caliper slidably receives and retains said outer brake pad in a direction parallel to the braking member and perpendicular to a direction of rotation of said braking member.

10. A vehicle brake as claimed in claim 8 wherein said inner brake pad has associated therewith a pin member which provides a structural component allowing said inner brake pad to move in a radial direction during actuation of said inner brake pad while providing the opposing force necessary to retain the brake pad in said caliper as the brake pad is applied to said braking member moving therepast.

11. A vehicle brake comprising a cylindrical ring braking member having a longitudinal axis and opposed braking surfaces located to opposite sides of said cylindrical braking member, a support arrangement for rotatably supporting said ring braking member for rotation about said longitudinal axis, and a brake caliper having an outer brake pad and an inner brake pad with an actuator for moving said inner brake pad towards said outer brake pad bringing said brake pads in to contact with said opposed braking surfaces, and wherein said caliper is connected to said support arrangement by two pivoting links which accommodate movement of said caliper relative to said braking member powered by said actuator during movement of said inner brake pad towards said outer brake pad, and wherein said actuator is part of and moves with said caliper.

12. A vehicle brake as claimed in claim 11 wherein said caliper is suspended from said support arrangement at a side thereof by said two pivoting links.

13. A vehicle brake as claimed in claim 12, wherein said two pivotting links with said caliper and said support arrangement form a parallelogram linkage.

14. A vehicle brake as claimed in claim 11, wherein said support arrangement includes a knuckle member.

15. A vehicle brake as claimed in claim 11, wherein said caliper is suspended by said pivotting links to provide a gravity bias positioning said caliper such that said brake pads are adjacent to but spaced from said braking surfaces when said actuator is not actuated.

16. A vehicle brake as claimed in claim 14, wherein said ring braking member is a single casting of a lightweight, high temperature aluminum composite material.

17. A vehicle brake as claimed in claim 16, wherein said knuckle arrangement and said caliper are of 356 aluminum material.

18. A vehicle brake as claimed in claim 11, wherein said caliper positions said brake pads at a side of said ring braking member approximately 90° from a top surface of said ring braking member.

* * * * *